Figure 1:
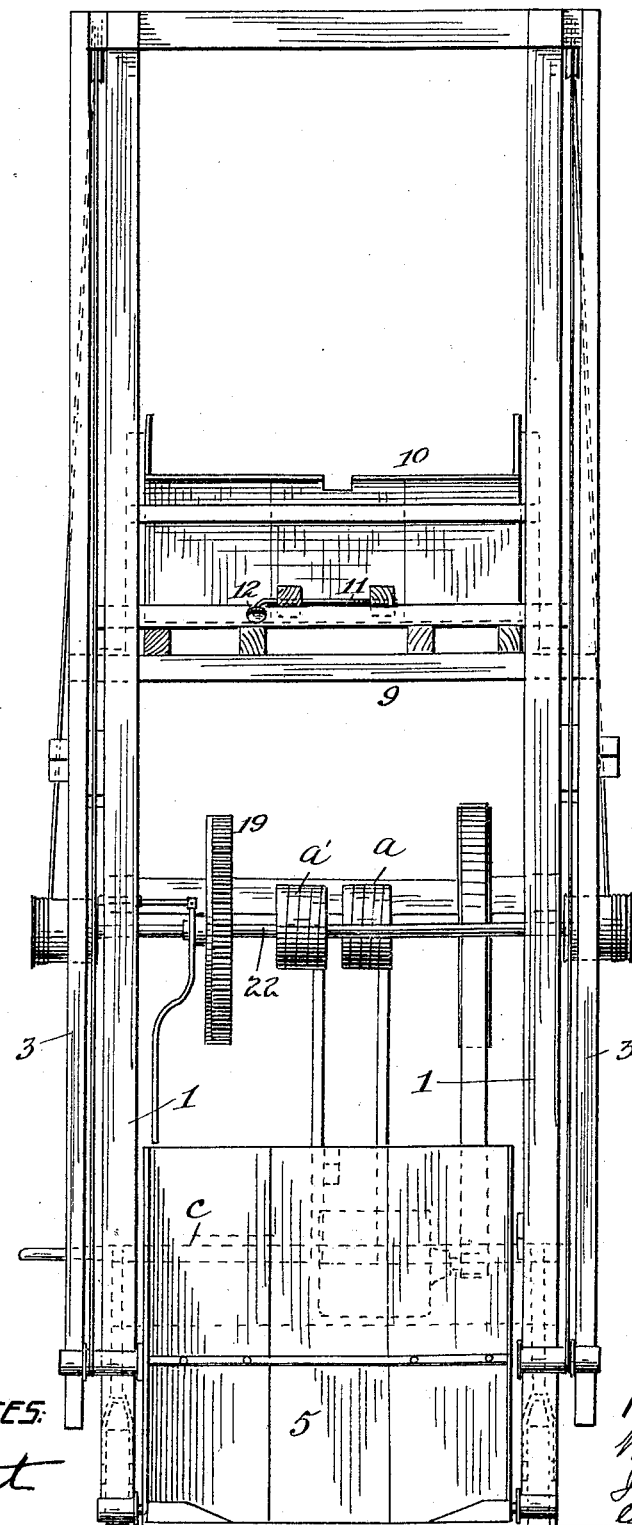

No. 783,195. PATENTED FEB. 21, 1905.
W. B. HARRISON & J. H. DIEL.
STORAGE ELEVATOR.
APPLICATION FILED APR. 3, 1903.

3 SHEETS—SHEET 1.

WITNESSES:

INVENTORS:

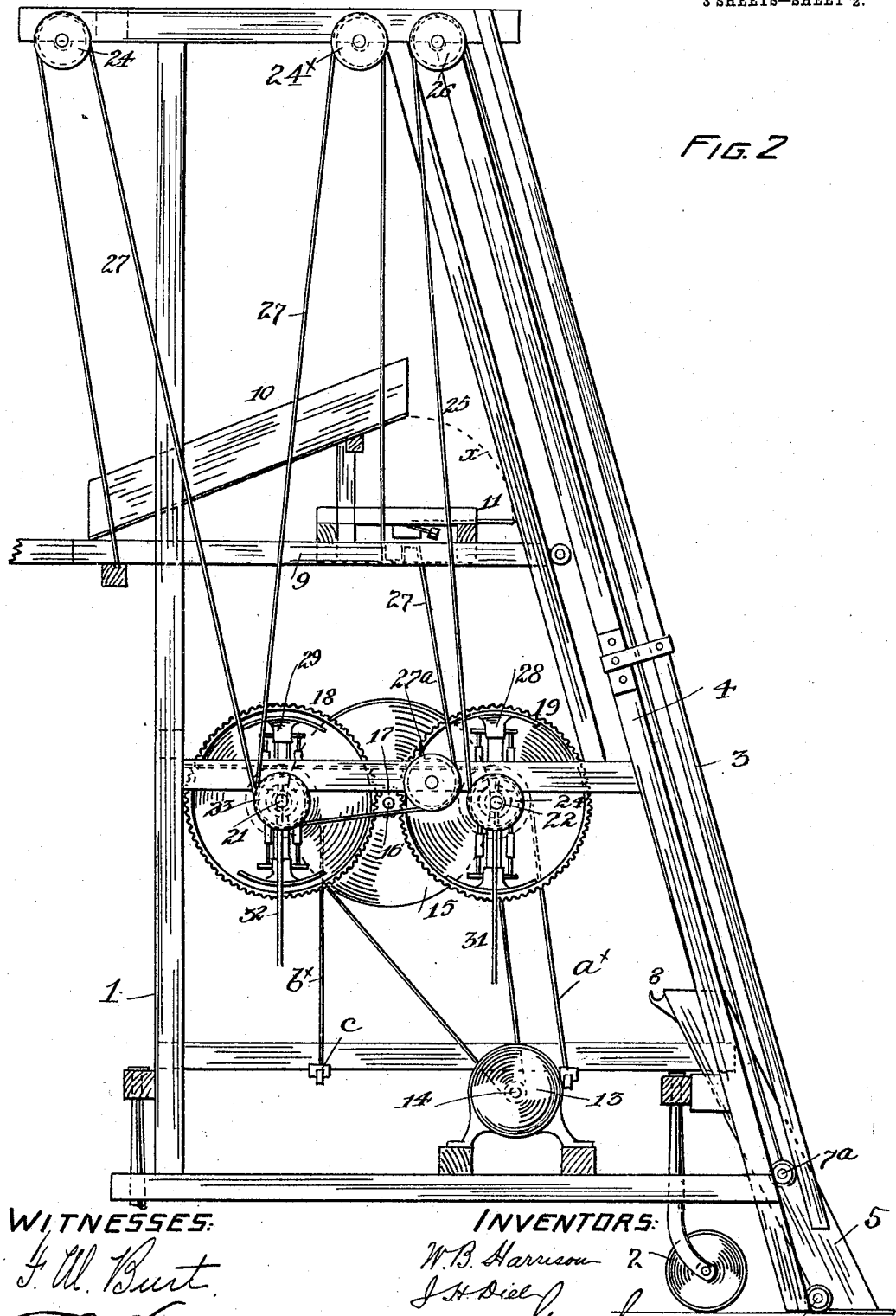

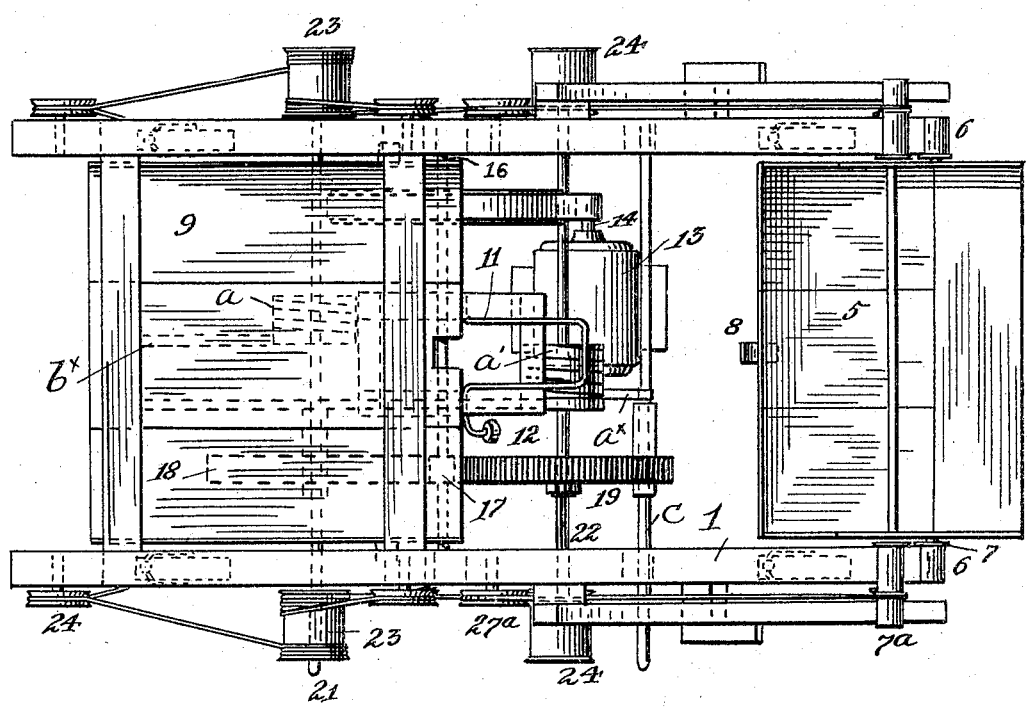

No. 783,195.

Patented February 21, 1905.

UNITED STATES PATENT OFFICE.

WILLIAM B. HARRISON AND JOSEPH H. DIEL, OF STOCKTON, CALIFORNIA; SAID DIEL ASSIGNOR TO DURRETT O. CASTLE, OF STOCKTON, CALIFORNIA.

STORAGE-ELEVATOR.

SPECIFICATION forming part of Letters Patent No. 783,195, dated February 21, 1905.

Application filed April 3, 1903. Serial No. 150,976.

*To all whom it may concern:*

Be it known that we, WILLIAM B. HARRISON and JOSEPH H. DIEL, citizens of the United States, residing at Stockton, in the county of San Joaquin and State of California, have invented certain new and useful Improvements in Storage-Elevators, of which the following is a specification.

This invention is an apparatus for facilitating the piling and stacking of merchandise and the lifting of the same from one level to another. It has therefore a somewhat comprehensive range of action; but its essential principles are embodied and are herein described and shown as applied to a machine for stacking and piling bags filled with grain. Obviously, however, a machine embodying the principles herein described, and shown in the drawings, can be used in other relations and for other purposes.

In the drawings in which the present machine is illustrated, Figure 1 is a front elevation of the machine. Fig. 2 is a side elevation. Fig. 3 is a top plan.

In describing the apparatus we shall consider it as a device for piling or stacking grain-bags in a warehouse in which they are to be stored. In this connection the idea is to save a great deal of labor and to economize in the work by providing a portable machine which will accomplish what at present requires a number of men. We provide a portable apparatus containing a lifting device and under the control of an operator and which is of sufficient height to lift the sacks of grain or other merchandise to a suitable position for discharging them at the point where they are to be stacked or piled. The machine is mounted upon casters or rollers, so that it can be moved from place to place. Any number of such machines can be used in the warehouse or other situation where the merchandise is to be lifted and stored.

In the drawings, 1 represents a frame of any suitable height supported upon rollers or casters 2, so that it can be moved from place to place. The front beams of the frame are preferably slightly inclined, as shown in Fig. 2. These front beams 3 and 4 on both sides are supported so as to form guideways for a carriage or elevator 5, which is movable bodily in said guides from the bottom toward the top and back again. The carriage 5 is provided with guide-rollers 6, and these rollers are mounted upon an axle or shaft 7. The normal position of the device is best indicated by Fig. 2, in which the carriage is shown as at the bottom of the machine, ready to receive a number of grain-bags or other merchandise to be lifted or discharged.

The carriage is pivoted upon the shaft $7^a$ and is provided with a hook 8, so that when said carriage arrives at a certain point the hook will be engaged by a mechanism to be hereinafter described, and this engagement will cause the entire carriage to tilt and discharge its load in its elevated position. It must be understood that the carriage, as shown in Fig. 2, is practically at the level of the floor, so that the grain-bags or other merchandise can be easily dumped into or upon it.

Adjustably supported in the machine is a table 9, upon which is mounted a chute 10. The purpose of this table and of its vertical adjustment is to enable the carriage or elevator which conveys the material upwardly to discharge it at the proper height. In stacking grain-bags, for instance, after they have been piled as high as can be conveniently done by hand this apparatus is brought into use and the table 9, with its chute 10, is adjusted to the elevation at which the next load should be delivered. Consequently as the pile grows in height the table 9, with its chute, is adjusted vertically higher and higher. The hook 8 on the carriage 5 strikes a bail 11 on the table 9, and as its upward movement continues it is caused to turn upon its axis $7^a$, and so discharge its contents into the chute 10. The dotted line $x$ in Fig. 2 indicates the course of the carriage in turning so as to register with the chute. It will have been evident from this description that after the grain-bags or other merchandise have been piled to a certain height the table 9 and its chute can be adjusted to that height, and one or more men standing on the pile or stack can receive the additional merchandise as fast as it is lifted by the carriage and discharged into the chute.

The construction and arrangement of the bail 11 is best shown in Fig. 3. It is pivoted in the table 9, and one end is provided with a counterweight 12 for restoring it to normal position. This manner of pivoting the bail enables the hook 8 of the carriage to lift said bail as the carriage moves upwardly. When the carriage moves downwardly, the counterweight attached to the bail automatically restores the latter to the position of Fig. 2.

Operating means are provided for accomplishing the various motions of the carriage and of the adjustable table, and in the drawings we have shown such operating means, although they are not the only operating means which are adapted to accomplish the same results. In the present case we have conventionally shown an electric motor 13 supplied with electrical power in any suitable way and whose shaft 14 is geared down to a pulley 15, secured to the shaft 16. Upon this shaft 16 is carried the pinion 17, which engages with the gears 18 19 and drives them continuously. These gears are mounted upon shafts 21 22, respectively, which carry drums 23 24, the latter receiving the cable or belting which accomplishes the adjustment of both the carriage and the table. On the drum 24 is wound a cable 25, which extends up and over a pulley 26 and thence down to the axis of the carriage. A cable 27 is attached to drum 23, being wound one or more times around said drum, passing thence up and over a pulley $24^\times$ at the top of the frame, thence down to the table 9, where it is attached by a clamp, thence passing under a guide-pulley $27^a$ on the frame, thence one or more times around drum 23, thence passing up and over an upper pulley numbered 24, thence down to table 9, passing through a hole in rear of table, thence to the opposite side of table, the direction of the cable being applied to the drums and pulleys on the opposite side to correspond with above description. The cable on both sides of the table is one continuous cable.

It being understood that the gears carried by the shafts 21 22 rotate constantly and that one shaft and gear controls the carriage, while the other shaft and gear controls the table, means have been provided for engaging these gears independently and separately with the cable-carrying drums, so that either the carriage or the table can be moved under the control of the operator. For this purpose any ordinary clutch can be provided, such as the sliding clutches 28 29, which by means of the levers 31 32 can be caused to bring either shaft 21 or 22 and the appropriate drums carried by them into operation.

It will be understood that the pinion 17 and the gears 18 and 19 are constantly revolving, but that the shafts upon which these parts are mounted are normally stationary. The operator by means of the levers 31 and 32 can cause the carriage to travel upwardly in its guides, bearing its load of merchandise, which merchandise will be discharged into the chute 10 by the hook and bail before described. Also under control of the same operator is the handle 32, by means of which the table 9, which carries the chute 10, can be elevated to the proper point so that the workmen on top of the pile will always receive the merchandise at the proper height. The idea is that a discharge-chute shall be provided which is adjustable as to height and which discharges material which is elevated by means of a carrier having an automatic tilting device for causing such discharge.

We do not limit ourselves to the particular constructions or devices shown in the accompanying drawings and herein described, as other means for elevating and adjusting the carriage and table might be employed, and we desire to avail ourselves of all modifications and equivalents which fall properly within the spirit of our invention. For instance, the carriage might be made long enough to form in itself the chute and to discharge the merchandise elevated by it.

On each of shafts 21 and 22 a frictional drum $a$ $a'$ is attached, Fig. 1. A steel or iron strap $b^\times$ is attached at rear of frame, thence around drum on shaft 21 one or more times, thence down to a lever C, attached to the frame, forming a friction-brake, which brake is for the purpose of holding in position frame 9 and carriage 5. The strap belonging to drum $a'$ is marked $a^\times$.

Having thus fully described our invention, what we claim as new, and desire to secure by Letters Patent, is—

1. In an elevating device, a movable frame, a carrier adjustable upwardly therein and adapted to receive and carry merchandise, a table vertically adjustable on said frame, and having a chute, and means for tilting said carrier and thereby causing it to discharge into said chute.

2. In an elevating device, the combination of a portable frame, a pivoted carrier suspended therein, and adapted to receive, raise and discharge merchandise, a table adjustable in said frame, an inclined chute carried by said table, and means for tilting said carrier so as to cause it to register with and discharge into the said chute.

3. In an elevating device, a portable frame, a rotary shaft mounted therein and carrying a pinion, shafts carrying loose gears, adapted to be driven by said pinion, a carrier for elevating merchandise, a table for discharging said merchandise, and means connected to the shafts upon which said carriers are mounted for controlling the motion of said carrier and said table.

4. In a storage-elevator, a frame, a carrier movable therein and adapted to elevate material, a chute supported by said frame, and adapted to receive material from said carrier, a rotary shaft, and means for driving it, a pinion on said shaft, a pair of loose gears engaging the said pinion, shafts therefor, clutches engaging said gears so as to connect their respective shafts to the operating mechanism, and suspension-cables from the respective carrier-shafts for supporting and elevating both the carrier and the chute.

5. In combination, a frame, a carrier movable upwardly therein, a vertically-adjustable table guided in the frame and a chute on the said table, substantially as described.

6. In a storage-elevator, the combination with a frame of a discharge-chute, a carrier movable in the same plane upwardly and downwardly in said frame, a vertically-movable table supporting said chute, and a brake for controlling the carrier and table.

In testimony whereof we have affixed our signatures, in presence of two witnesses, this 11th day of March, 1903.

WILLIAM B. HARRISON.
JOSEPH H. DIEL.

Witnesses:
C. L. NEUMILLER,
C. F. HUTCHINSON.